April 16, 1957  G. O. HOFFSTETTER  2,788,927
GARBAGE DISPOSAL TRANSPORT
Filed April 1, 1954  4 Sheets-Sheet 1
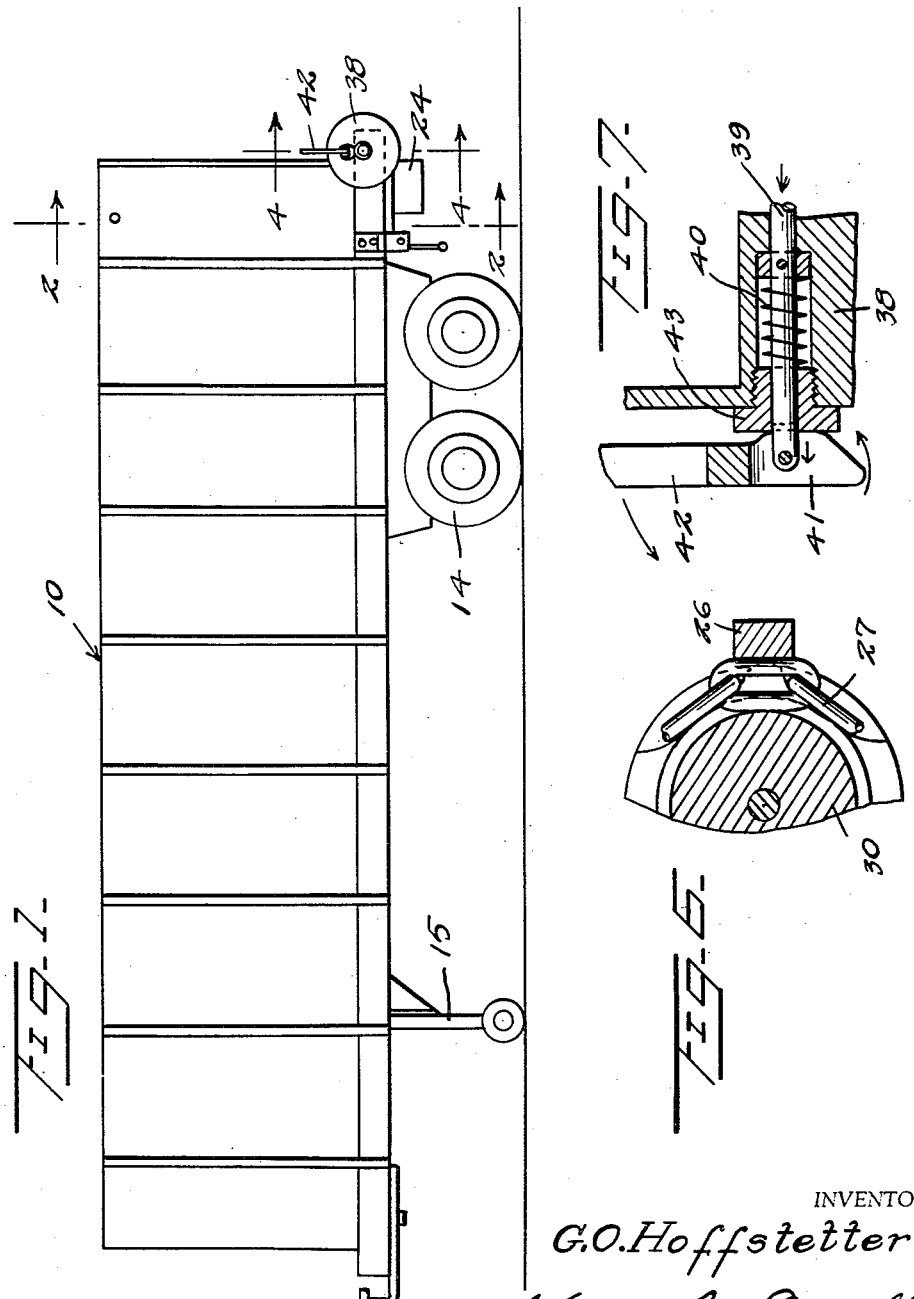
INVENTOR
G.O. Hoffstetter
BY Kimmel & Crowell
ATTORNEYS

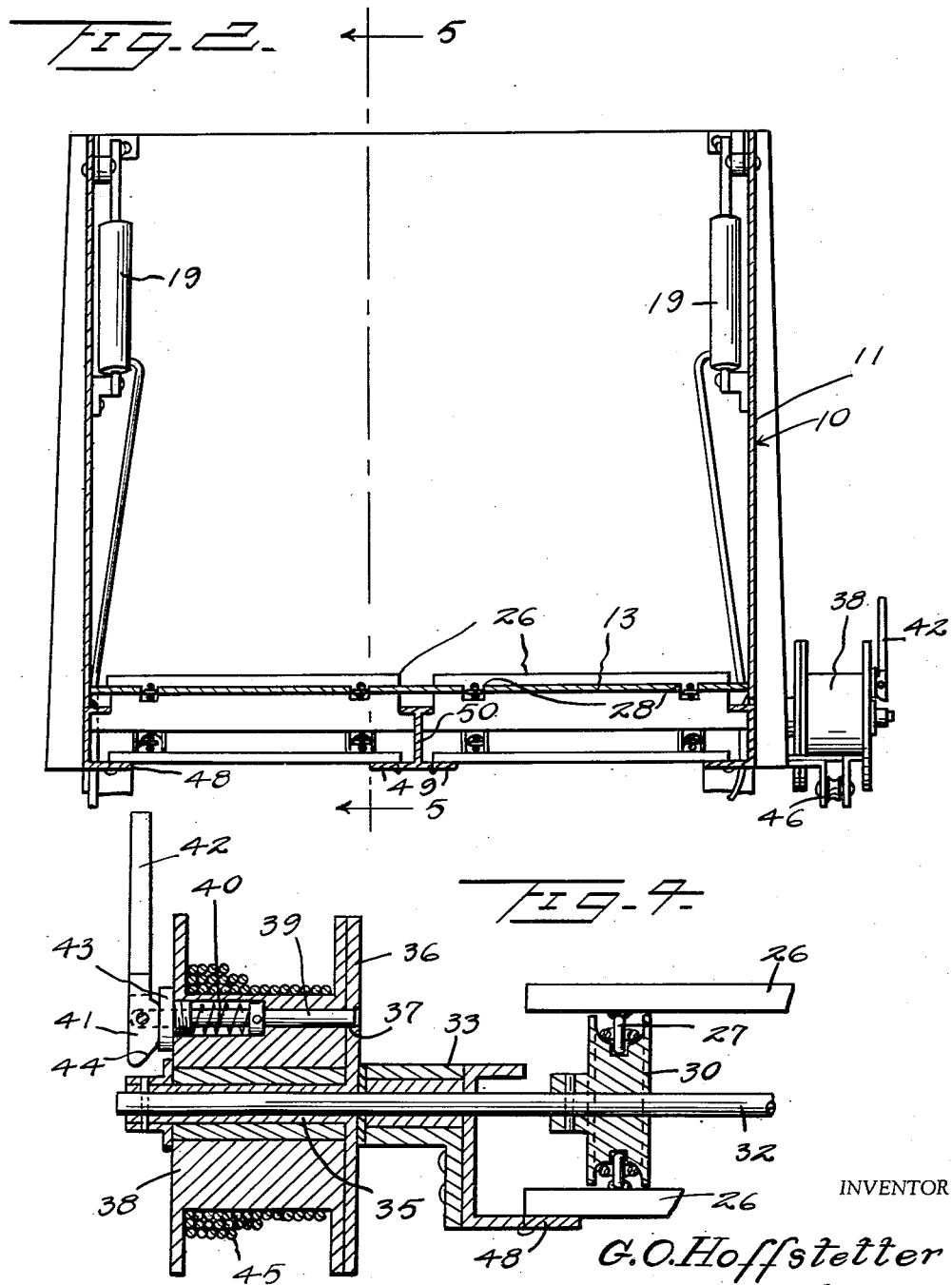

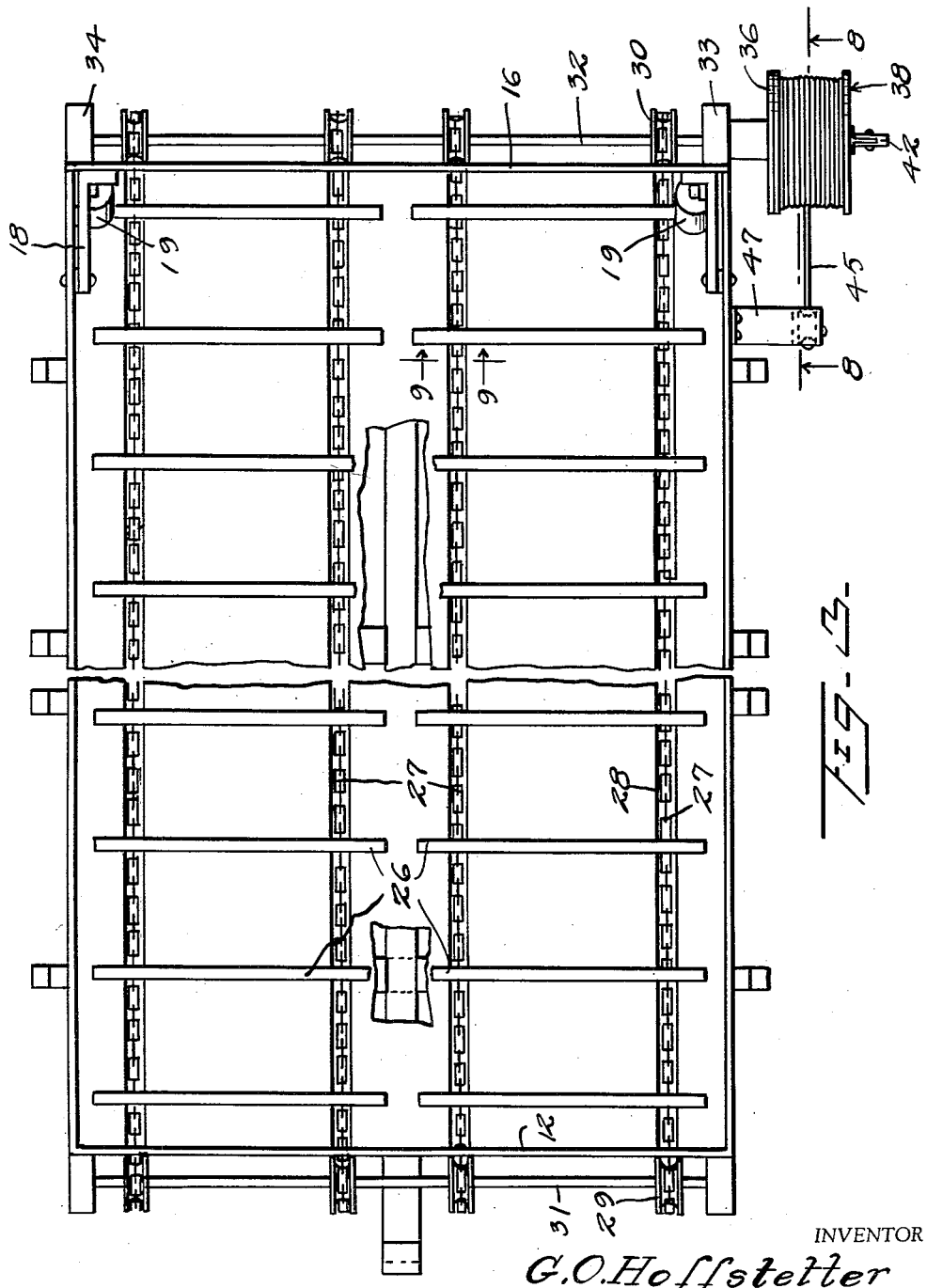

April 16, 1957     G. O. HOFFSTETTER     2,788,927
GARBAGE DISPOSAL TRANSPORT
Filed April 1, 1954                          4 Sheets-Sheet 4
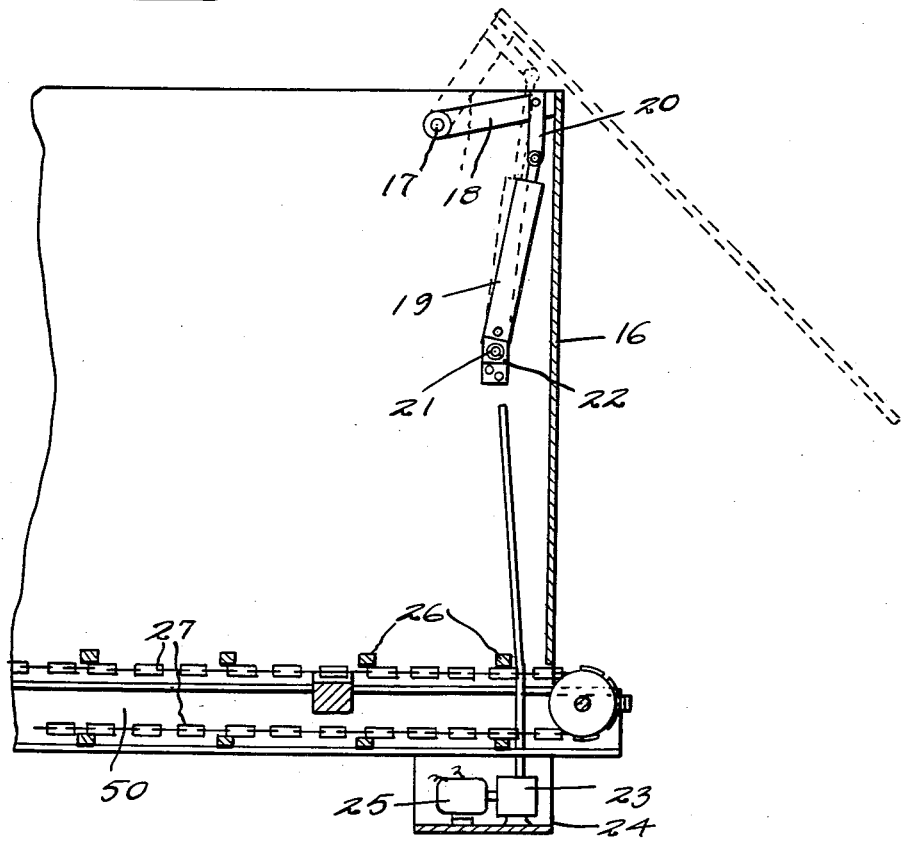
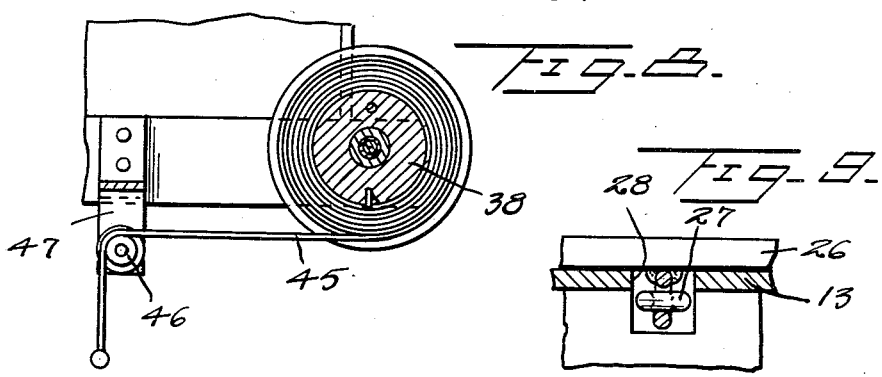
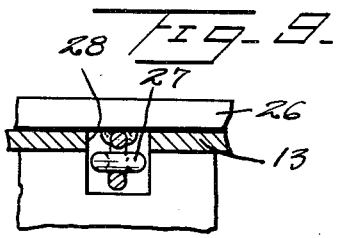
INVENTOR
G. O. Hoffstetter
BY Kimmel & Crowell
ATTORNEYS

United States Patent Office 2,788,927
Patented Apr. 16, 1957

2,788,927
GARBAGE DISPOSAL TRANSPORT
George Otto Hoffstetter, Jerseyville, Ill.

Application April 1, 1954, Serial No. 420,239

1 Claim. (Cl. 222—415)

This invention relates to a hopper body with a discharge conveyor in the bottom thereof.

An object of this invention is to provide a hopper body in the form of a trailer with an endless discharge conveyor in the bottom thereof for discharging the material from the rear end of the body.

Another object of this invention is to provide a hopper or trailer body having a hydraulically operated tailgate at the rear, and with an endless discharge conveyor in the bottom thereof, the conveyor being movable by means of a cable wound on a drum at one end of the conveyor.

A further object of this invention is to provide in an endless discharge conveyor for a hopper body, a winding drum at the rear end of the conveyor with an improved simple clutch whereby the drum may be manually rewound.

A further object of this invention is to provide in a hopper body and discharge conveyor, a hydraulic tailgate operator with an electrically operated pressure pump on the body adapted for mounting on the rear of the body so that the body may be constructed as a self-sufficient trailer body which is particularly designed for a garbage disposal and pick-up body which may be coupled to a tractor member.

With the above and other objects in view, my invention consists in the arrangement, combination and details of construction disclosed in the drawings and specification, and then more particularly pointed out in the appended claim.

In the drawings:

Figure 1 is a detail side elevation of a hopper body having a material discharge means mounted therein constructed according to an embodiment of this invention.

Figure 2 is a sectional view taken on the line 2—2 of Figure 1.

Figure 3 is a top plan view, partly broken away, of the device.

Figure 4 is a fragmentary sectional view taken on the line 4—4 of Figure 1.

Figure 5 is a fragmentary sectional view taken on the line 5—5 of Figure 2.

Figure 6 is a fragmentary sectional view taken through one of the chain pulleys.

Figure 7 is a fragmentary sectional view showing the clutch mechanism.

Figure 8 is a fragmentary sectional view taken on the line 8—8 of Figure 3.

Figure 9 is a fragmentary sectional view taken on the line 9—9 of Figure 3.

Referring to the drawings, the numeral 10 designates generally a hopper body which is formed of side walls 11, end walls 12, and a bottom wall 13. The body 10 has wheels 14 rotatably carried adjacent one end thereof and the other end of the body 10 is adapted to be connected to a tractor vehicle. When the body 10 is in inoperative position the body is supported in a horizontal position by means of a retractable supporting wheel structure 15.

The body 10 has a rear gate 16 pivotally mounted on pivot means 17 with arms 18 extending forwardly of the gate 16 and pivotally secured to the pivot 17. Gate 16 is moved to open or closed position by hydraulic means 19 connected with gate 16 by means of a link 20. The lower end of the hydraulic means 19 is pivotally mounted as at 21 on a bracket 22.

Fluid pressure is provided for the hydraulic member 19 by means of a pump 23 supported beneath the hopper body 10 on a supporting platform 24, and pump 23 is operated by means of an electric motor 25 or other power means.

The body 10 is adapted to contain garbage, and in order to provide for removal of the material from the rear end of the body 10, I have provided a plurality of transversely extending cleats 26. There are two sets of cleats 26 and each set of cleats is secured to a pair of endless chains 27.

The bottom 13 is provided with a pair of longitudinal openings 28 in which the chains 27 travel, and the chains 27 are trained about forward and rear pulleys or grooved wheels 29 and 30 mounted on shafts 31 and 32. The shaft 32 is the rear or driving shaft and is journalled through bearings 33 and 34 carried by the rear portion of the hopper body structure.

Shaft 32 has fixed thereon a bushing or sleeve 35 with a disc-shaped plate 36 fixed to the inner end of sleeve or bushing 35. Plate 36 forms one portion of a clutch and is provided with a plurality of circumferentially arranged keeper openings 37. A reel 38 is rotatably carried by the bushing 35 and a locking or clutch pin 39 extends loosely through the reel 38 and is adapted to be engaged in a selected one of the keeper or clutch openings 37.

Clutch pin 39 is spring-pressed by means of a spring 40 to locking or clutching position, and the outer end of pin 39 has pivotally secured thereto a cam 41 which is carried by a hand lever 42. Cam 41 bears against a bushing 43 which is threaded into reel or drum 38.

When handle 42 is substantially at right angles to shaft 32, clutch pin 39 will be engaged in a selected one of the openings 37. When handle 42 is rocked outwardly to an oblique angle, with cam face 44 engaging the outer side of bushing 43, clutch pin 39 will be pulled outwardly from keeper openings 37 to released position.

At this time reel or drum 38 can be rotated without rotation of shaft 32 and handle 42 may be used as a crank for rotating reel or drum 38 so as to wind thereabout a cable 45. Cable 45 has one end extending from reel 38 about an idler pulley 46 carried by a bracket or support 47.

In the use and operation of this device, gate 16 is initially swung upwardly to an open position as shown in dotted lines in Figure 5. Cable 45, engaging over pulley 46, may then be pulled rearwardly by hand. As cable 45 unwinds from reel 38, shaft 32 will be rotated and the cleats 26 engaging over bottom 13 will move the material rearwardly for discharge at the rear of the body 10.

The cleats on the lower run of the conveyor structure will ride over inwardly projecting bars 48 which extend inwardly from the sides of the body 10 and will also ride over guide bars or rails 49 which are extended from a central I beam 50 which extends lengthwise of the body 10.

In the event all of the material has not been discharged from the body 10 when cable 45 is substantially completely unwound from reel 38, clutch handle 42 is swung outwardly to release clutch pin 39 whereupon cable 45 may be rewound on reel or drum 38.

The hopper discharge means hereinbefore described will provide a convenient and simple means whereby material such as garbage or the like in the hopper body may be manually discharged by a pull on the cable.

What is claimed is:

A garbage disposal transport vehicle comprising a hopper body having opposite side walls, front and rear end walls, and a bottom wall, a transversely disposed driven shaft rotatably mounted at the front of said body below said bottom wall, a drive shaft disposed at the rear of said body below said bottom wall, spaced apart pairs of grooved wheels fixed to each shaft, spaced pairs of endless conveyor chains trained about said wheels, said bottom wall having parallel longitudinal openings intermediate the side edges thereof in which the upper runs of said chains travel, independent cleats having their lower edges fixed to the upper edge of each pair of said chains and having their lower edges slidably engaging over the upper surface of said bottom wall, a winding drum loose on one end of said drive shaft, a cable for said drum, releasable clutch means for coupling said drum to said drive shaft, a handle pivoted on said winding drum for actuating said clutch means, said handle when in clutch released position providing means for manually turning said drum for winding said cable about said drum, a bracket carried by said body, and a grooved idler pulley rotatably carried by said bracket, said cable extending from said drum about said idler pulley, said cable when unwound from said drum with said clutch in engaged position moving said conveyor chain rearwardly in said body.

References Cited in the file of this patent

UNITED STATES PATENTS

| | | |
|---|---|---|
| 2,130,670 | Maynes | Sept. 20, 1938 |
| 2,197,600 | Wimer | Apr. 16, 1940 |
| 2,345,328 | Conway et al. | Mar. 28, 1944 |
| 2,478,583 | Hybbert | Aug. 9, 1949 |
| 2,595,392 | Lalancette | May 6, 1952 |
| 2,630,928 | McCombs | Mar. 10, 1953 |
| 2,668,629 | Dahlman | Feb. 9, 1954 |